(12) United States Patent
Scepanovic et al.

(10) Patent No.: US 9,632,384 B2
(45) Date of Patent: Apr. 25, 2017

(54) ELECTRICALLY ACTIVATED LENS COMPONENT WITH INTERLOCK FEATURE

(71) Applicant: Apple Inc., Cupertino, CA (US)

(72) Inventors: Miodrag Scepanovic, San Jose, CA (US); Yoshikazu Shinohara, Omiya (JP); Iain Alexander McAllister, Campbell, CA (US); Jun Yoshida, Ageo (JP)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/727,621

(22) Filed: Jun. 1, 2015

(65) Prior Publication Data

US 2016/0377947 A1 Dec. 29, 2016

Related U.S. Application Data

(60) Provisional application No. 62/032,453, filed on Aug. 1, 2014.

(51) Int. Cl.
*H04B 1/3827* (2015.01)
*G02F 1/153* (2006.01)

(52) U.S. Cl.
CPC .......... *G02F 1/153* (2013.01); *H04B 1/3833* (2013.01)

(58) Field of Classification Search
CPC ........ G02F 1/153; G02F 1/157; G02F 1/1533; H04B 1/3833; H04N 5/2254; H04N 5/2353; H04N 5/238; H04N 9/045; G02B 13/0035; G02B 13/006; G02B 13/04; G02B 13/0015; G02B 13/002; G02B 13/004; G02B 13/0085; G02B 13/009; G02B 13/02; G02B 13/06; G02B 13/18; G02B 15/16; G02B 15/173; G02B 15/177; G02B 3/08; G02B 5/04; G02B 5/1814; G02B 7/003; G02B 7/021; G02B 9/12; G02B 9/60
USPC ........................................................ 455/566
See application file for complete search history.

(56) References Cited

U.S. PATENT DOCUMENTS

| 5,150,234 | A | 9/1992 | Takahashi et al. |
| 5,555,069 | A | 9/1996 | Albrecht et al. |
| 6,426,492 | B1 | 7/2002 | Bos et al. |
| 7,245,347 | B2 | 7/2007 | Lundgren |
| 7,929,220 | B2 | 4/2011 | Sayag |
| 2003/0227664 | A1* | 12/2003 | Agrawal ............... G02F 1/1523 359/269 |

(Continued)

OTHER PUBLICATIONS

PCT International Search Report and Written Opinion for PCT International Appln No. PCT/US2015/040050 mailed Oct. 8, 2015. (10 pages).

*Primary Examiner* — Nathan Taylor
(74) *Attorney, Agent, or Firm* — Blakely, Sokoloff, Taylor & Zafman LLP

(57) ABSTRACT

A mobile device lens assembly having an electrically activated lens component with an electro-optic portion is disclosed. More particularly, embodiments of the mobile device lens assembly include the electro-optic portion and an interlock feature to engage a second lens element. The second lens element may have an interlock surface, which when engaged or mated with the interlock feature of the electrically activated lens component, may maintain alignment of the lens components along an optical axis. Other embodiments are also described and claimed.

20 Claims, 7 Drawing Sheets

(56) References Cited

U.S. PATENT DOCUMENTS

| | | | | |
|---|---|---|---|---|
| 2004/0135917 | A1* | 7/2004 | Mihara | G02B 13/02 |
| | | | | 348/335 |
| 2004/0141086 | A1* | 7/2004 | Mihara | H04N 5/2254 |
| | | | | 348/335 |
| 2004/0201902 | A1* | 10/2004 | Mihara | G02B 15/177 |
| | | | | 359/676 |
| 2007/0126898 | A1* | 6/2007 | Feldman | G02B 9/12 |
| | | | | 348/294 |
| 2013/0094073 | A1* | 4/2013 | Ushigome | G02F 1/1523 |
| | | | | 359/275 |
| 2013/0278714 | A1* | 10/2013 | Hirose | G02B 13/0035 |
| | | | | 348/36 |
| 2014/0029114 | A1* | 1/2014 | Kim | G02B 3/08 |
| | | | | 359/709 |
| 2014/0184845 | A1* | 7/2014 | Nakayama | G02B 13/04 |
| | | | | 348/222.1 |
| 2014/0192257 | A1* | 7/2014 | Gleason | G02F 1/153 |
| | | | | 348/363 |
| 2015/0043078 | A1* | 2/2015 | Suzuki | G02B 15/173 |
| | | | | 359/576 |

* cited by examiner

DETAIL A

ELECTRICALLY ACTIVATED LENS COMPONENT WITH INTERLOCK FEATURE

This application claims the benefit of U.S. Provisional Patent Application No. 62/032,453, filed Aug. 1, 2014, and this application hereby incorporates herein by reference that provisional patent application.

BACKGROUND

Field

Embodiments related to lens assemblies having a lens component with an electro-optic portion, are disclosed. More particularly, an embodiment related to a mobile device lens assembly having an electrically activated lens component with an electro-optic portion, is disclosed.

Background Information

Camera modules have been incorporated in a variety of consumer electronics devices, including mobile devices such as smart phones, mobile audio players, personal digital assistants, and other portable and desktop computers. A typical camera module includes an optical system used to collect and transmit light from an imaged scene to an image sensor. The optical system generally includes at least one lens associated with one aperture. The lens collects and transmits light. The aperture limits the light collected and transmitted by the lens, and is therefore termed the stop aperture, or alternatively, the entrance pupil aperture. The effective diameter of the stop aperture combined with the lens focal length determines the "F number" of the lens. A lens with a lower F number produces a brighter image than a lens with a larger F number and, as a result, reduces the image noise in a low light scene. However, as the F number is reduced, the lens depth of field decreases and, as a result, lens aberrations increase. Thus, there is an optimal stop aperture diameter, dependent on the lens and the scene being imaged, to minimize image noise and maximize image resolution.

In most portable consumer electronics devices, minimizing device profile is an important design goal. Accordingly, device profile requirements generally prohibit the use of an iris diaphragm as a variable stop aperture. Thus, product designs often aim to minimize the device profile, known as z-height, by fixing the aperture diameter in the optical system for a particular zoom factor. This design choice minimizes the F number without noticeably affecting achievable resolution, both from design and manufacturing standpoints. As a result of this design paradigm, users have been unable to adjust and optimize the F number for a particular scene in a mobile application.

SUMMARY

Lens assemblies having a lens component with an electro-optic portion, particularly for use in portable consumer electronics device applications are disclosed. In an embodiment, a mobile device lens assembly includes an electrically activated lens component having an electro-optic portion sandwiched between, and optically aligned with, a front lens and a rear lens. The electro-optic portion may have an electrochromic layer coupled with a substrate, and both the front lens and the rear lens may be coupled with opposite sides of the electro-optic portion. In an embodiment, an interlock boss extends rearward, e.g., axially rearward, from a rear surface of the electro-optic portion to engage with an interlock surface of a second lens element of the mobile device lens assembly. Engagement of the interlock surface and the interlock boss may align the electrically activated lens component and the second lens element along the optical axis. In an embodiment, a second interlock boss extends forward, e.g., axially forward, from the second lens element, and the interlock surface is on the second interlock boss, such that the interlock bosses engage to resist transverse dislocation of the electrically activated lens component relative to the second lens element.

In an embodiment, a mobile device lens assembly having an electrically activated lens component with an electro-optic portion includes a biconvex lens component. For example, the electrically activated lens component may include a front lens and a rear lens, which when combined with the electro-optic portion, form a biconvex lens structure. The biconvex lens structure may be a positive, i.e., converging, lens structure. In an embodiment, a second lens element of the mobile device lens assembly may include a meniscus lens element. That is, the second lens element may form a meniscus lens structure. The meniscus lens structure may be a negative, i.e., diverging, lens structure.

In an embodiment, a mobile device lens assembly may include numerous other optical elements or components between an electrically activated lens component with an electro-optic portion and an image sensor. For example, at least two intermediate lens elements may be located between the electrically activated lens component and the image sensor. Furthermore, in an embodiment, a field flattener lens may be located between the intermediate lens elements and the image sensor. The electrically activated lens component, the intermediate lens elements, and the field flattener lens may all be aligned along the optical axis. Furthermore, the lens structures, such as the hybrid lens structure of the electrically activated lens component, may allow for the mobile device lens assembly to have a compact design. For example, a front lens of the electrically activated lens component may be separated from the field flattener lens by a z-height of less than 6 mm.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

DETAILED DESCRIPTION

Figure 1:
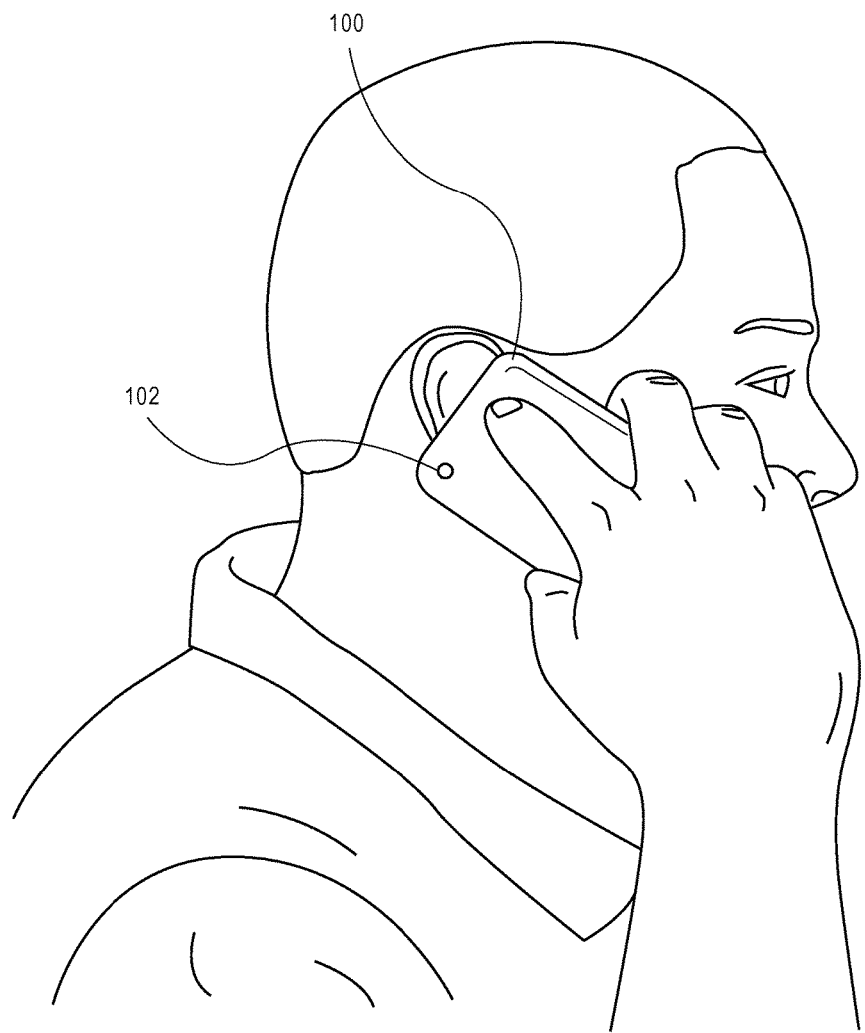
FIG. 1 is a pictorial view of a portable consumer electronics device having a camera module.

Embodiments describe lens assemblies having a lens component with an electro-optic portion, particularly for use in portable consumer electronics device applications. However, while some embodiments are described with specific regard to integration within mobile electronics devices, the embodiments are not so limited and certain embodiments may also be applicable to other uses. For example, a lens assembly having a lens component with an electro-optic portion may be incorporated into a camera module that remains at a fixed location, e.g., a traffic camera, or used in a relatively stationary application, e.g., as a lens in a multimedia disc player.

In various embodiments, description is made with reference to the figures. However, certain embodiments may be practiced without one or more of these specific details, or in combination with other known methods and configurations. In the following description, numerous specific details are set forth, such as specific configurations, dimensions, and processes, in order to provide a thorough understanding of the embodiments. In other instances, well-known processes and manufacturing techniques have not been described in particular detail in order to not unnecessarily obscure the description. Reference throughout this specification to "one embodiment," "an embodiment", or the like, means that a particular feature, structure, configuration, or characteristic described is included in at least one embodiment. Thus, the appearance of the phrase "one embodiment," "an embodiment", or the like, in various places throughout this specification are not necessarily referring to the same embodiment. Furthermore, the particular features, structures, configurations, or characteristics may be combined in any suitable manner in one or more embodiments.

In an aspect, a mobile device lens assembly incorporates an electrically activated lens component having an electro-optic portion aligned with a second lens element. The electro-optic portion may include an electrically active surface having variable optical properties, and may be sandwiched between a front lens and a rear lens. Furthermore, the electro-optic portion or the lenses may include an interlock feature to engage an interlock surface of the second lens element. Thus, when the interlock feature and the interlock surface are engaged, transverse dislocation of the second lens element relative to the electrically activated lens component is resisted and the lens components of the mobile device lens assembly remain aligned along an optical axis.

In an aspect, a mobile device lens assembly incorporates an electrically activated lens component having an electrically activated aperture such that a user may vary a lens assembly F number to control an incident light level on an image sensor without significantly increasing the space required for the lens assembly. In an embodiment, the electrically activated lens component incorporates the electrically activated aperture between multiple lens layers having different optical properties to create the combined functionality of an achromatic doublet and an aperture in a compact package. Thus, the mobile device lens assembly, which may also include a second lens element and several intermediate lens elements between the second lens element and a field flattener lens, may have an overall z-height of less than 6 mm, e.g., 5.5 mm.

Referring to FIG. 1, a pictorial view of a portable consumer electronics device having a camera module is shown. A portable consumer electronics device 100, e.g., a smartphone, is being held by a user. As mentioned above, portable consumer electronics device 100 may be another, not necessarily portable, device. In an embodiment, portable consumer electronics device 100 includes an integrated camera module 102 that incorporates a mobile device lens assembly.

Figure 2:
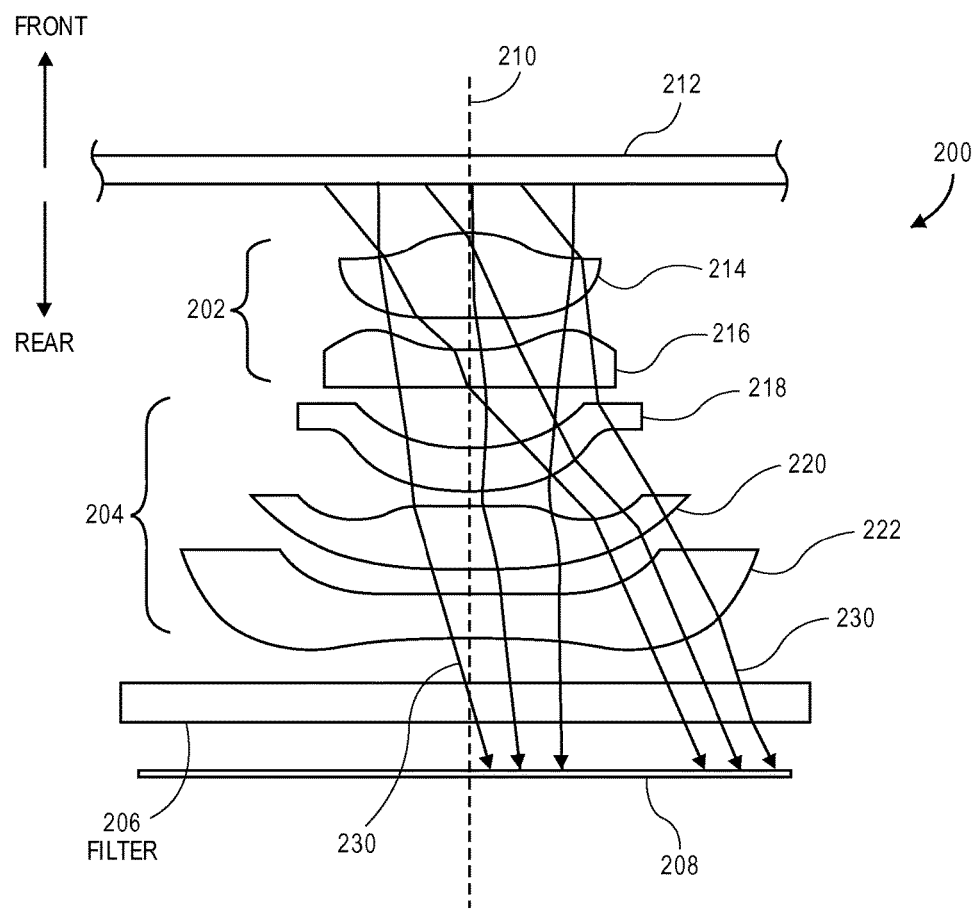
FIG. 2 is a side view of a mobile device lens assembly of a camera module.

Referring to FIG. 2, a side view of a mobile device lens assembly of a camera module is shown. A mobile device lens assembly 200 may be considered to be typical of portable consumer electronics devices 100 having camera module 102 with a fixed aperture. The mobile device lens assembly 200 may incorporate a doublet 202 and a lens stack 204. One or more filters, such as infrared filter 206, may also be aligned with the lenses of mobile device lens assembly 200 to reflect or block certain wavelengths of light that a user does not wish to transmit to an image sensor 208. Thus, mobile device lens assembly 200 may include numerous lenses, filters, and other optical elements or components aligned along an optical axis 210 between an external window 212 and image sensor 208. External window 212 may, for example, be a transparent glass or polymer window located substantially coplanar with a mobile device external housing.

The various optical elements or components of mobile device lens assembly 200 may be paired or grouped to achieve various optical functionalities. For example, doublet 202 may function as an achromatic lens to limit the effects of chromatic aberration. More specifically, doublet 202 may be an achromatic doublet 202 having lens one 214 and lens two 216. Lens one 214 may be a positive, i.e., converging, lens element and lens two 216 may be a negative, i.e., diverging, lens element. The lenses may be formed and mounted such that the chromatic aberration of lens one 214 is counterbalanced by the chromatic aberration of lens two 216. More specifically, the shape and materials of the lens one 214 and lens two 216 may be varied to complement each other and achieve the desired chromatic aberration correction.

In an embodiment, lens stack 204 functions to limit the effects of monochromatic aberrations. More specifically, lens stack 204 may include lens three 218, lens four 220, and lens five 222, each of which is formed and mounted to correct optical aberrations caused by the geometry of the lenses. The number and shapes of the hybrid lenses is shown by way of example, and other numbers or shapes of the lenses may be used to correct the targeted optical aberrations, such as spherical aberrations.

Still referring to FIG. 2, in an embodiment, a plurality of image rays 230 are reflected or emitted from a scene and transmit or pass through external window 212, mobile device lens assembly 200, and infrared filter 206, to image sensor 208. A relative illumination of image sensor 208 by image rays 230 may depend on both placement of an aperture and an angle of incidence of image rays 230 relative to optical axis 210, i.e., the object angle. For example, as the distance between an aperture and lens one 214 is increased or as the object angle is increased, relative illumination of image sensor 208 decreases. This drop in relative illumination indicates vignetting, a generally undesirable phenomenon that is an important consideration when incorporating a variable aperture into an optical system. Thus, incorporation of a variable aperture along the optical path may require that the variable aperture be located to limit vignetting, as well as overall z-height of the lens assembly 200.

The incorporation of a variable aperture in an imaging system has been suggested to improve focusing and depth of field. Technologies exist to realize such a variable aperture, such as artificial muscles and electro-optic apertures. Electro-optic apertures may include, for example, an electrochromic medium that can attenuate light from a scene as the light passes through the aperture. The stop aperture diameter may be varied based on a voltage applied to the electro-optic aperture components. However, such solutions suffer from integration problems. For example, introducing an electro-optic aperture in front of doublet 202, such as when it is mounted on the external window 212, may increase vignetting. Furthermore, to mitigate such vignetting, the semi-diameters of doublet 202 lenses may be increased; however, doing so may increase overall z-height of the system. Additionally, given the spacing between system optics, alignment of an electro-optic aperture with doublet 202 lenses along optical axis 210 can be difficult to perfect, and thus, overall lens performance may be degraded. Finally, in an optical system that utilizes autofocus, complexities in changing the F number in relation to focus make overall system management difficult to achieve. Similar trade-offs may occur by introducing an electro-optic aperture behind lens one 214. For example, placing an electro-optic aperture between the doublet 202 lenses may require an increase in the separation between lens one 214 and lens two 216, resulting in increased z-height. Additionally, placement of an electro-optic aperture between the doublet 202 lenses may promote misalignment of the lenses, which could degrade image quality.

Figure 3:
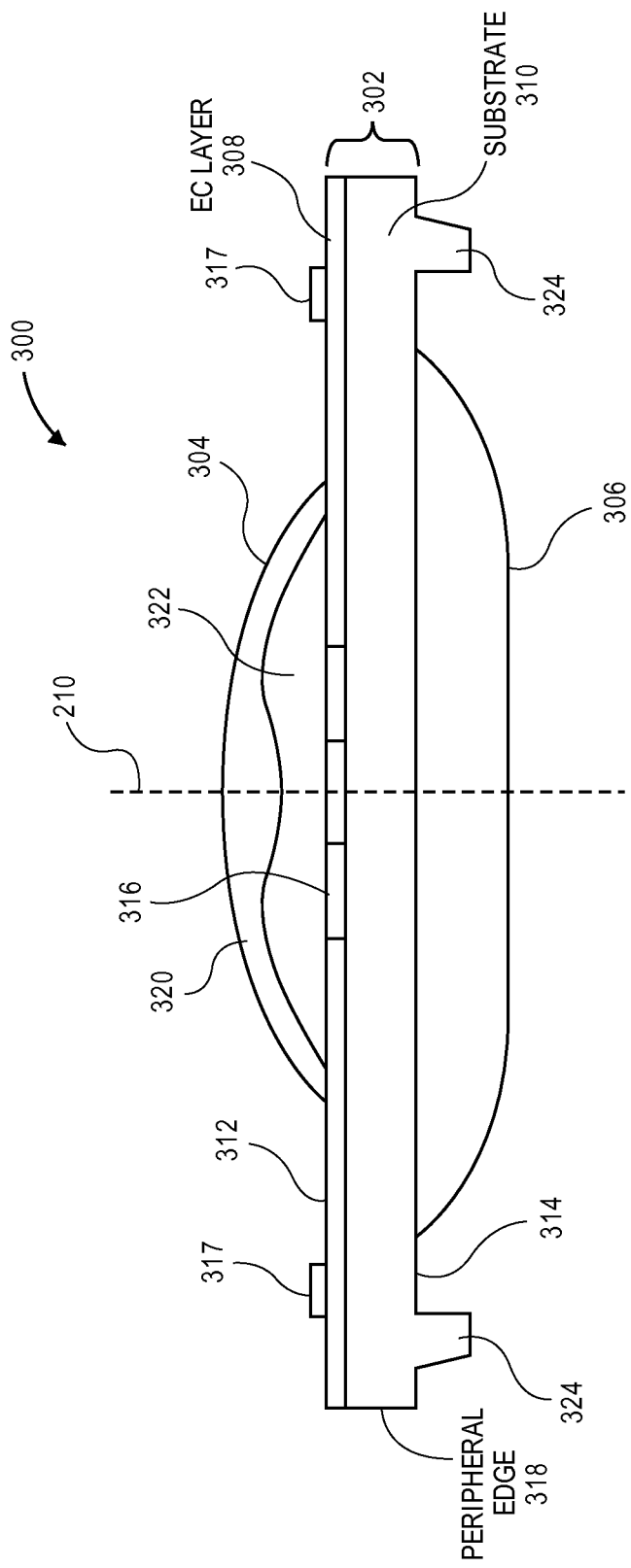
FIG. 3 is a cross-sectional view of an electrically activated lens component in accordance with an embodiment.

Referring to FIG. 3, a cross-sectional view of an electrically activated lens component is shown in accordance with an embodiment. In an embodiment, an electrically activated lens component 300 may include an electro-optic portion 302 and one or more integrated lenses. For example, electro-optic portion 302 may be located between a front lens 304 and a rear lens 306. Thus, in an embodiment, electrically activated lens component 300 may provide the combined functionality of doublet 202 and an electro-optic aperture, as described below.

In an embodiment, electro-optic portion 302 includes an electrochromic layer 308 on a substrate 310. Although not evident in FIG. 3, electrochromic layer 308 may include multiple component layers that combine to create an electrically variable pupil 316. For example, an ion source, an ion conduction layer, and an active electrochromic layer may be arranged between substrate 310 and one or more transparent conductors electrically connected to a variable voltage source, as described further below. Thus, electrochromic layer 308 effectively provides a pupil whose width or size is electrically variable. When the pupil has been electrically controlled into a small or narrow opening, highly collimated image rays 230 are admitted toward image sensor 208. By contrast, when the pupil is configured into a large or wide opening, un-collimated rays are admitted toward image sensor 208. As previously discussed, the pupil size controls the stop aperture, and thus, influences image quality. In an embodiment, the pupil size may be controlled to vary between two aperture modes. For example, a larger aperture mode may have an F number in a range of about F/1.4 to F/2.2, e.g., F/1.8. A smaller aperture mode may have an F number in a range of about F/2.4 to F/3.2, e.g., F/2.8. Various embodiments of electro-optic portion 302 are described below, but in at least one embodiment, electro-optic portion 302 includes front surface 312 on electrochromic layer 308 and rear surface 314 on substrate 310. A distance between front surface 312 and rear surface 314 may be constant over substantially the entire width of electro-optic portion 302 supporting front lens 304 and rear lens 306. For example, in an embodiment, the thickness of electro-optic portion 302 is 200 micron or less across the width of electro-optic portion 302. Alternatively, the distance may vary, e.g., electro-optic portion 302 may be thinner or thicker near a peripheral edge 318 than near optical axis 210.

The variable voltage source (not shown) may be connected to one or more electrical contacts 317 to supply voltage and/or current to the transparent conductors of electrochromic layer 308. As shown, in an embodiment, electrical contacts 317 may be located on front surface 312, although in other embodiments, one or more electrical contact 317 may be located on a different surface, such as rear surface 314. By varying the voltage supplied to the transparent conductors of the electro-optic portion 302, an effective diameter of the variable pupil 316 may be changed to modify an aperture size of the electrochromic layer 308.

Substrate 310 may be any material having structural and optical characteristics suitable for the present application. More specifically, substrate 310 may be adequately rigid to support electrochromic layer 308. Furthermore, substrate 310 may be adequately transparent to permit light passing from front lens 304 through electrochromic layer 308 to transmit onward toward rear lens 306. Accordingly, substrate 310 material candidates may include glass, sapphire, or polycarbonate, to name a few. Thus, substrate 310 may include a rigid, transparent, film or cylindrical object with one or more flat surface. In an embodiment, a diameter or maximum dimension of substrate 310 is greater than a diameter of front lens 304 or rear lens 306, such that a peripheral edge 318 of electro-optic portion 302 extends laterally beyond an edge of front lens 304 and/or rear lens 306.

In an embodiment, front lens 304 and rear lens 306 may be formed to include the same or different lens types. For example, both front lens 304 and rear lens 306 may include a plano-convex structure, with the planar surface of each lens fixed to electro-optic portion 302, e.g., at front surface 312 or rear surface 314. Alternatively, one or more of front lens 304 or rear lens 306 may include a plano-concave structure. Thus, in combination, front lens 304 and rear lens 306 may form an overall lens structure for electrically activated lens component 300 that is a synthesis or combination of the individual elements. For example, in an embodiment in which both front lens 304 and rear lens 306 include plano-convex structures, electrically activated lens component 300 may be a biconvex lens component. Furthermore, the biconvex lens component may be a positive, i.e., converging, lens component. However, in other embodiments, electrically activated lens component 300 may have a combined lens structure that is of a different lens type and/or acts as a negative lens component, rather than a positive lens component.

In an embodiment, front lens 304 and/or rear lens 306 may include a multi-layered structure. For example, front lens 304 may include an outer lens layer 320 and an inner lens layer 322. The layers may have a laminate structure. The multiple layers may be shaped to achieve the desired optical characteristics, e.g., chromatic aberration correction or focal properties. As an example, outer lens layer 320 may include a convexity near optical axis 210 and inner lens layer 322 may include a meshing concavity in the same region. Furthermore, each of the multiple layers, e.g., outer lens layer 320 and inner lens layer 322, may be formed from the same or different materials and those materials may include the same or different optical characteristics, e.g., indices of refraction. Accordingly, the complementary geometries and optical properties of outer lens layer 320 and inner lens layer 322 may form a composite lens structure that provides a positive element of a doublet lens, like that of lens one 214.

In an embodiment, front lens 304, electro-optic portion 302, and rear lens 306 may be aligned along optical axis 210. More specifically, an optical axis of each of front lens 304, electro-optic portion 302, and rear lens 306 may be coaxially arranged along optical axis 210. Since front lens 304, rear lens 306, and electro-optic portion 302 may be fixed relative to each other, this coaxial arrangement may be maintained regardless of system movement. Furthermore, since the interfacing surfaces of front lens 304, electro-optic portion 302, and rear lens 306 may be fixed relative to each other in a coplanar fashion at front surface 510 and rear surface 512, respectively, the angular alignment between electrically activated lens component 300 sub-components may be maintained regardless of system movement. Accordingly, optical alignment between electrically activated lens component 300 sub-components, once set, may remain stable throughout system use.

Electrically activated lens component 300 may include features to maintain alignment with other lens elements in a lens assembly, as well. For example, an interlock boss 324 may extend rearward, e.g., axially rearward, from rear surface 314. As explained below, interlock boss 324 may be sized and configured to engage or mate with a surface of an adjacent lens element to align the lens components along optical axis 210 and to prevent dislocation of the aligned lens components during use. The projecting interlock boss may be formed with a variety of structures to facilitate engagement or meshing with the adjacent lens element. In an embodiment, interlock boss 324 may include a circular embossment, e.g., a raised ring, on rear surface 314. Thus, although the cross-sectional view of FIG. 3 indicates that interlock boss 324 may have the structure of, e.g., one or more pegs, ridges, or the like, the raised surface of interlock boss 324 may be a single continuous raised feature, such as a ring or another pattern, e.g., a continuous trace with one or more arcuate sections, a star pattern, etc.

Electrically activated lens component 300 may be constructed in numerous fashions within the scope of this disclosure. In an embodiment, each of front lens 304, electro-optic portion 302, and rear lens 306 may be formed separately and then aligned and integrated with each other using thermal or adhesive bonding processes. In another embodiment, electrically activated lens component 300 may be formed through a single process that includes a plurality of overmolding or replication steps in which front lens 304 is formed, electro-optic portion 302 is deposited on front lens 304, and rear lens 306 is formed over electro-optic portion 302. Molding of lenses 304, 306 on electro-optic portion 302 may be performed directly, i.e., uncured resin may be introduced over a surface of electro-optic portion 302 and cured to a cured state in order to form an integrated body having an electro-optic aperture and a lens. In an alternative embodiment, a hybrid process of molding and bonding steps may be used. In other embodiments, press fits, mechanical fasteners, or other known fastening techniques may be used to physically connect electrically activated lens component 300 sub-components. Thus, it will be appreciated that electrically activated lens component 300 may be manufactured according to numerous methods.

The manufacturing process may allow for the introduction of additional features. For example, it may be necessary to form electrical contacts 317 on electro-optic portion 302 at locations that are accessible to allow for electrical connections to be provided for varying the voltage to electrochromic layers. Thus, electrical contacts 317 may be placed on front surface 312, rear surface 314, or on peripheral edge 318 of electro-optic portion 302, and on substrate 310 in particular, to allow such electrical connections to be formed. Accordingly, electrical contacts 317 may be formed prior to overmolding lenses on electro-optic portion 302. Alternatively, locations dedicated to the formation of electrical contacts 317 after overmolding may be accessible through front lens 304 or rear lens 306 of electrically activated lens component 300. For example, voids or holes may be formed in the lenses to allow a direct line of sight to electro-optic portion 302.

The manufacturing process may also allow for the formation of interlock boss 324 using a variety of techniques. For example, interlock boss 324 may be directly molded, machined, or otherwise fabricated integrally with substrate 310. Alternatively, interlock boss 324 may be separately formed and then bonded to substrate 310 using thermal or chemical welding technologies.

The optical elements, components, or sub-components may be treated to introduce additional optical characteristics to a mobile device lens assembly. For example, one or more surfaces of front lens 304 sub-component, rear lens 306 sub-component, or electro-optic portion 302 sub-component may be coated with anti-reflective coating or optical filter material, e.g., infrared filter material, to provide electrically activated lens component 300 with optical filtering capabilities. In an embodiment, treatment of other optical elements of a mobile device lens assembly, such as those described below, may similarly be performed during manufacturing.

Figure 4:
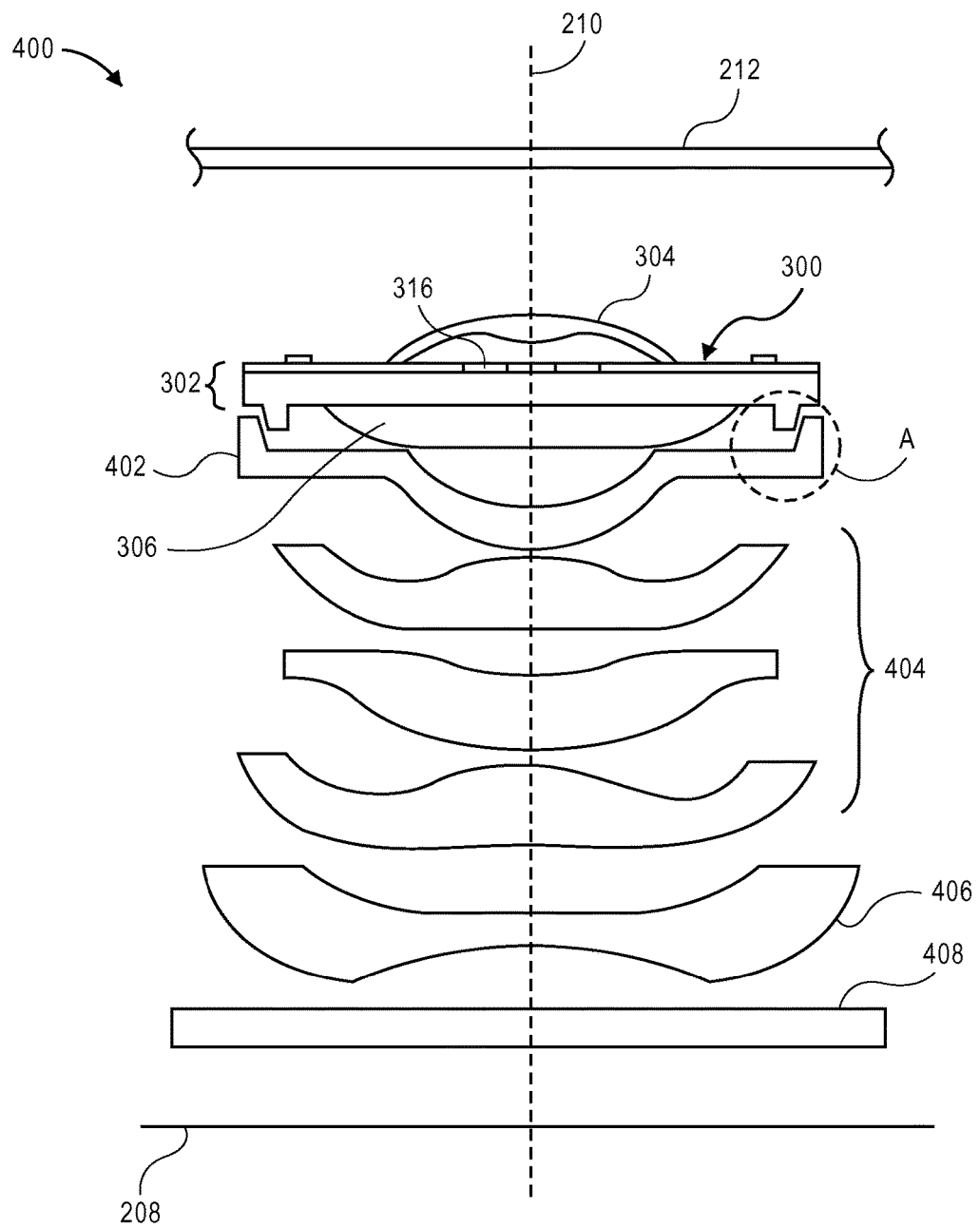
FIG. 4 is a side view of a mobile device lens assembly having a lens component with an electrically activated lens component with an interlock feature in accordance with an embodiment.

Referring to FIG. 4, a side view of a mobile device lens assembly having a lens component with an electrically activated lens component with an interlock feature is shown in accordance with an embodiment. A mobile device lens assembly 400 may include electrically activated lens component 300 directly behind external window 212. Electrically activated lens component 300 may replace doublet 202 in mobile device lens assembly 200. That is, as a result of the multi-layered structural shape and optical properties, front lens 304 may effectively replace the function of lens one 214 in mobile device lens assembly 200. For example, front lens 304 having one or more layers may provide a positive element. Similarly, the shape and optical properties of rear lens 306 may be such that rear lens 306 may effectively replace the function of lens two 216 in mobile device lens assembly 200 described above. For example, rear lens 306 may provide either a positive lens element or a negative lens element as needed. As mentioned above, the geometry and optical properties of each lens as well as each layer in each lens, of electrically activated lens component 300, may be varied to complement each other and achieve the desired chromatic aberration correction. Furthermore, given that electrically activated lens component 300 components mate with each other and remain robustly aligned, the integration of electro-optic portion 302 does not require additional physical separation between front lens 304 and rear lens 306 or introduce alignment instabilities. Thus, electrically activated lens component 300 may be used in mobile device lens assembly 200 without appreciably increasing device z-height or degrading optical system performance.

In an embodiment, a second lens element 402 is located behind electrically activated lens component 300. Second lens element 402 may be any of various types of lenses. For example, in an embodiment, second lens element 402 is a meniscus lens element having a concave side facing rear lens 306. The meniscus lens element may be converging or diverging. For example, in an embodiment, second lens element is a negative meniscus lens element. Second lens element 402 may be formed from a variety of suitable optical materials, including glass or sapphire, as well as plastics, e.g., polycarbonate. Accordingly, second lens element 402 may be manufactured using typical lens manufacturing techniques, such as lens molding techniques.

Mobile device lens assembly 400 may include one or more intermediate lens elements 404 behind second lens element 402. For example, in an embodiment, at least two intermediate lenses 404 are located between second lens element 402 and image sensor 208. The intermediate lens elements 404 may be of the same or different lens types. That is, each of intermediate lens elements 404 may be any spherical or aspherical lens type. Accordingly, intermediate lens elements 404 may be formed from a variety of suitable optical materials, including glass or sapphire, as well as plastics, e.g., polycarbonate. Intermediate lens elements 404 may also be manufactured using typical lens manufacturing techniques, such as lens molding techniques.

In an embodiment, mobile device lens assembly 400 includes a field flattener lens 406 behind second lens element 402, and optionally behind intermediate lens elements 404. Field flattener lens 406 may counter the field-angle dependence of mobile device lens assembly 400 and thus adjust and/or lower image distortion. Field flattener lens 406 may be formed from a variety of suitable optical materials, including glass or sapphire, as well as plastics, e.g., polycarbonate. Field flattener lens 406 may also be manufactured using typical lens manufacturing techniques, such as lens molding techniques.

Like mobile device lens assembly 200, mobile device lens assembly 400 may include one or more filters, such as optical filter 408, which may be aligned with the lenses of mobile device lens assembly 400 to reflect or block certain wavelengths of light that a user does not wish to transmit to image sensor 208. For example, filter 408 may include an infrared cut filter. Thus, mobile device lens assembly 400 may include numerous lenses, filters, and other optical elements, components, or sub-components aligned along an optical axis 210 between an external window 212 and image sensor 208.

As described above, in an embodiment, mobile device lens assembly 400 includes two aperture modes: a large aperture mode and a small aperture mode. Furthermore, the lens assembly may be variable in that it is able to transition between both modes continuously. In each operating mode, a pupil profile of electrically activated lens component 300 may have a Gaussian intensity profile. That is, the light intensity registered at the image sensor 208 from light transmitted through variable pupil 316 may follow a continuous, rather than a discrete, decrease from the optical axis 210 toward an outer edge of the image sensor 208 at which light intensity values may be near zero. Thus, the electrically activated aperture may be adjusted to control the incident light level on the image sensor 208.

In an embodiment, mode selection may be performed manually or automatically based on an image shooting environment. For example, the large aperture mode may be selected and used in very low ambient light level scenes. Conversely, the small aperture mode may be selected and used to capture relatively bright scenes. Thus, the size of the aperture may be varied depending on the available ambient light level. Controlling the light throughput of the electrically activated lens component 300, in addition to the Gaussian intensity profile of the variable pupil 316, may sharpen image details in low and mid-field heights. In an embodiment, the mobile device lens assembly 400 may have an equivalent 28 mm focal length with distortion of less than 2%, relative illumination greater than 40%, and high resolution in the visible wavelengths at object distances between infinity and 10 cm.

Figure 5:
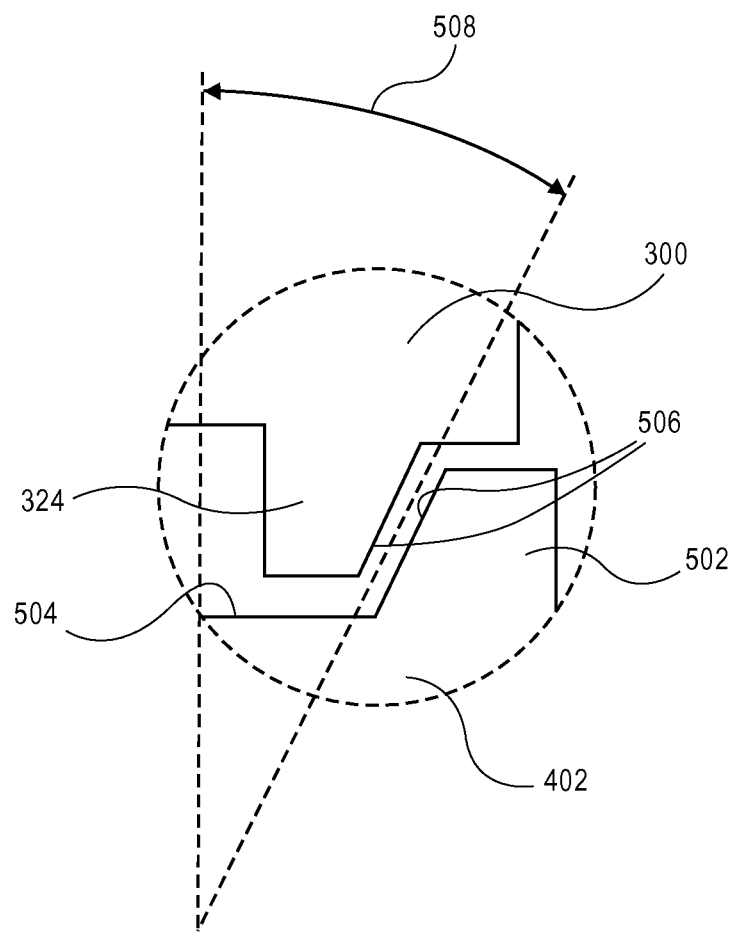
FIG. 5 is a detail view, taken from Detail A of FIG. 3, of an interlock feature to align lens components of a mobile device lens assembly in accordance with an embodiment.

Referring to FIG. 5, a detail view, taken from Detail A of FIG. 3, of an interlock feature to align lens components of a mobile device lens assembly is shown in accordance with an embodiment. One or more of the optical elements or components of mobile device lens assembly 400 may be secured relative to another by an external frame or by features incorporated in the optical element or component structures that engage or mate with one another. For example, as described above, electrically activated lens component 300 may include interlock boss 324 projecting from rear surface 314 toward second lens element 402. Similarly, second lens element 402 may include a second interlock boss 502 projecting toward electrically activated lens component 300, e.g., projecting axially forward. Second interlock boss 502 may have a structure similar to that of interlock boss 324. Thus, as described above with respect to interlock boss 324, second interlock boss 502 may include an embossed ring on an upper surface 504 of second lens element 402. Furthermore, like interlock boss 324, second interlock boss 502 may be an extension of the lens element, e.g., may be an axially extending feature formed integrally with the lens element 402 or overmolded on the lens element 402.

It will be appreciated that although the interlock features have been described as being embossments on respective lens elements or components, other interlock structures are possible. For example, interlock boss 324 may project axially from electrically activated lens component 300, while the mating interlock feature on second lens element 402 may be a groove that receives interlock boss 324. Thus, the interlock structures described herein are not intended to be restrictive.

As shown in FIG. 5, the circular embossment of second interlock boss 502 may have a larger diameter than a diameter of interlock boss 324, and thus, when the interlock bosses are assembled together, respective interlock surfaces 506 may engage, mesh, or mate to resist transverse movement of one lens component relative to another. That is, since an embossed ring on electrically activated lens component 300 will essentially nest within an embossed ring on second lens element 402, the likelihood of dislocation or movement of electrically activated lens component 300 relative to second lens element 402 is reduced.

In addition to preventing relative transverse motion between lens elements or components after assembly, the interlock bosses 324, 502 may also aid assembly and alignment of mobile device lens assembly 400. For example, during manufacturing of the lens elements or components, the geometries of interlock bosses may be controlled relative to optical axis 210 within a tolerance on the micron scale, and thus, when the lens elements or components are assembled such that interlock boss 324 engages and/or nests within interlock boss 502, the optical axes of each lens element or component will be aligned with one another on the same order, i.e., on the micron scale. Accordingly, the need for subsequent alignment procedures during manufacturing of mobile device lens assembly 400 may be reduced or eliminated altogether.

To facilitate assembly and engagement of interlock bosses, respective interlock surfaces 506 may be angled such that when the lens elements or components are brought together in an axial direction, the interlock bosses 324, 502 will self-locate in a radial direction while still resisting transverse dislocation. In an embodiment, a slope of interlock surfaces 506 may have an interlock surface angle 508 of between 5 to 45 degrees, e.g., in a range of 15 to 30 degrees, to achieve this end.

Interlock features 324, 502 may have other configurations suited to maintaining a transverse location of electrically activated lens component 300 relative to another lens element or component, e.g., second lens element 402. For example, in an embodiment, an inner dimension or diameter of interlock boss 324 may be larger than an outer dimension or diameter of interlock boss 502. Thus, interlock boss 502 may nest within interlock boss 324 rather than vice versa. The nested bosses may resist transverse dislocation between the respective lens components 300, 402.

In an embodiment, one interlock boss may be configured to receive and surround another interlock boss. For example, interlock features 324 may be pegs protruding from rear surface 314 toward second lens element 402. The pegs may have any cross-section, e.g., rectangular, circular, etc., that engages a receiving feature formed in second lens element 402. More particularly, the interlock feature 502 of second lens element 402 may be a counterbore, hole, or other receptacle sized and shaped to receive the pegs. One or more mating pegs and holes may be used to resist dislocation of the mating lenses. For example, a single peg and hole fastener may be used to resist movement but allow the lenses to rotate relative to each other about a peg axis. Alternatively, two or more peg and hole fasteners may be used to resist rotation and transverse movement of one lens relative to another. The pegs and holes may be arranged in a meshing pattern such that engagement of the pegs and holes causes the lenses to be rotationally aligned.

In an embodiment, the mating surfaces 506 of interlock features 324, 502 may be threaded to allow one lens component or element to screw into the other lens element or component. For example, an outer surface 506 of interlock feature 324 may be threaded with an external thread that mates with an internal thread located on an inner surface of interlock feature 502. Thus, when the interlock features 324, 502 are threaded together, electrically activated lens component 300 may be rotated relative to second lens element 402 to cause axial movement between the lenses while resisting transverse dislocation of one lens component or element relative to the other lens element or component.

Figure 6:
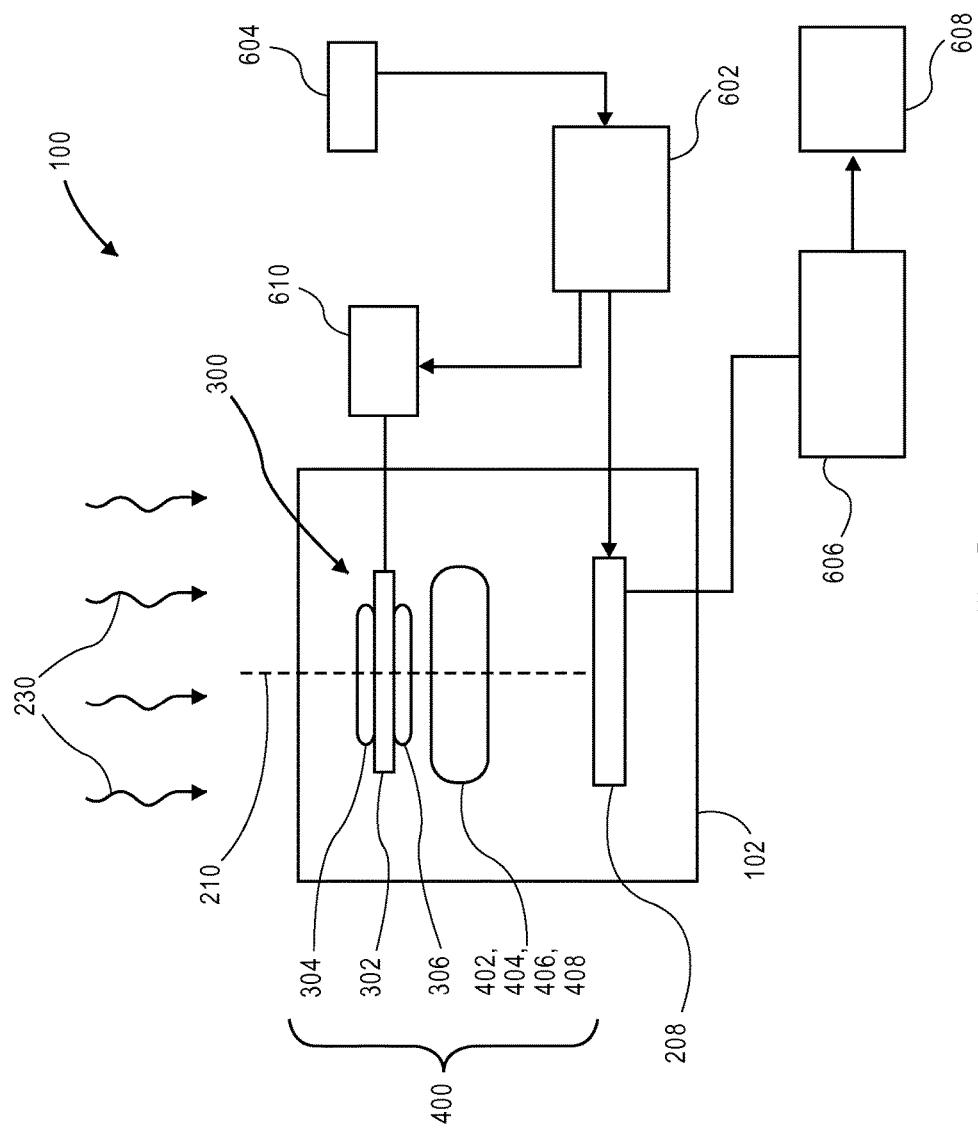
FIG. 6 is a schematic view of camera related elements including a mobile device lens assembly having an electrically activated lens component in accordance with an embodiment.

Referring to FIG. 6, a schematic view of camera related elements including a mobile device lens assembly having an electrically activated lens component is shown in accordance with an embodiment. In an embodiment, portable consumer electronics device 100 includes camera module 102 having mobile device lens assembly 400 axially aligned with image sensor 208. In an embodiment, mobile device lens assembly 400 includes electrically activated lens component 300, which includes electro-optic portion 302, front lens 304, and rear lens 306, physically connected and axially aligned with each other. Electrically activated lens component 300 and one or more of the other optical elements or components of mobile device lens assembly 400, e.g., second lens element 402, intermediate lenses 404, field flattener lens 406, etc., may be optically aligned along optical axis 210. However, in some embodiments, rather than each optical component or element being physically located along a straight line, one or more mirrors or optical deflectors may be used to allow one or more of the optical components or elements to be physically arranged in a non-linear fashion. Nonetheless, given that image rays 230 may propagate from a scene along optical axis 210 through such optical components, elements, and mirrors, the lenses of mobile device lens assembly 400 may be considered to be optically aligned along optical axis 210.

Although discussion to this point has focused primarily on the function of mobile device lens assembly 400 to correct chromatic and monochromatic aberrations, it will be appreciated that the various lenses ultimately function to focus image rays 230 from a scene onto image sensor 208. More specifically, some portion of mobile device lens assembly 400 may include either a fixed focus optical subsystem or a variable focus subsystem that implements an autofocus mechanism. There may also be an optical zoom mechanism as part of mobile device lens assembly 200. Thus, one or more of the lenses of mobile device lens assembly 400 may function to produce an optical image on an active pixel array portion of image sensor 208. Accordingly, image sensor 208 may be any conventional solid-state imaging sensor such as a complimentary metal-oxide-semiconductor (CMOS) sensor chip, able to capture the focused optical image.

Image capture may be affected by an exposure controller 602 interfaced with image sensor 208 and various mechanisms used to adjust mobile device lens assembly 400. Image sensor 208 may receive certain parameters for determining an exposure for taking a picture from exposure controller 602. The sensor parameters may include pixel integration time, which may be set by exposure controller 602 in accordance with any suitable exposure control algorithm that considers various input variables (e.g., level of scene illumination and the availability of a flash or strobe illumination). Exposure controller 602 may automatically perform the algorithm to determine an appropriate exposure setting and then signal image sensor 208 to update its parameters in response to actuation of a shutter release 604. Exposure controller 602 may be implemented as a programmed processor or as a completely hardwired logic state machine together with stored parameter options. In an embodiment, exposure controller 602 sets parameters for lens position that can be used to drive mechanisms to control an optical zoom lens or an autofocus mechanism.

Once a digital image representing image rays 230 is captured by image sensor 208 under the chosen exposure setting, the digital image may be transferred to an image storage 606. Image storage 606 may be a solid state volatile or non-volatile memory. Digital images stored in image storage 606 may be accessed for further processing and analysis by higher layer camera functions 608. Such processing may yield, by way of example, a compressed image file in a JPEG format or a compressed video file in an MPEG format.

In an embodiment, a driver circuit 610 controls the effective pupil size of electro-optic portion 302. Driver circuit 610 may receive a control signal or command from exposure controller 602, which represents the desired pupil size. In response to this command, driver circuit 610 may output an appropriate drive voltage to electrical contacts 317 on electro-optic portion 302 of electrically activated lens component 300 in order to create the desired stop aperture for the image being shot.

In addition to the functionality described above, portable consumer electronics device 100 may include numerous other functions implemented with components not shown. For example, portable consumer electronics device 100 may include a communication network interface, a display screen, a touch screen, a keyboard, or an audio transducer, to name a few. Thus, the system configuration of portable consumer electronics device 100 described above is not restrictive.

Figure 7:
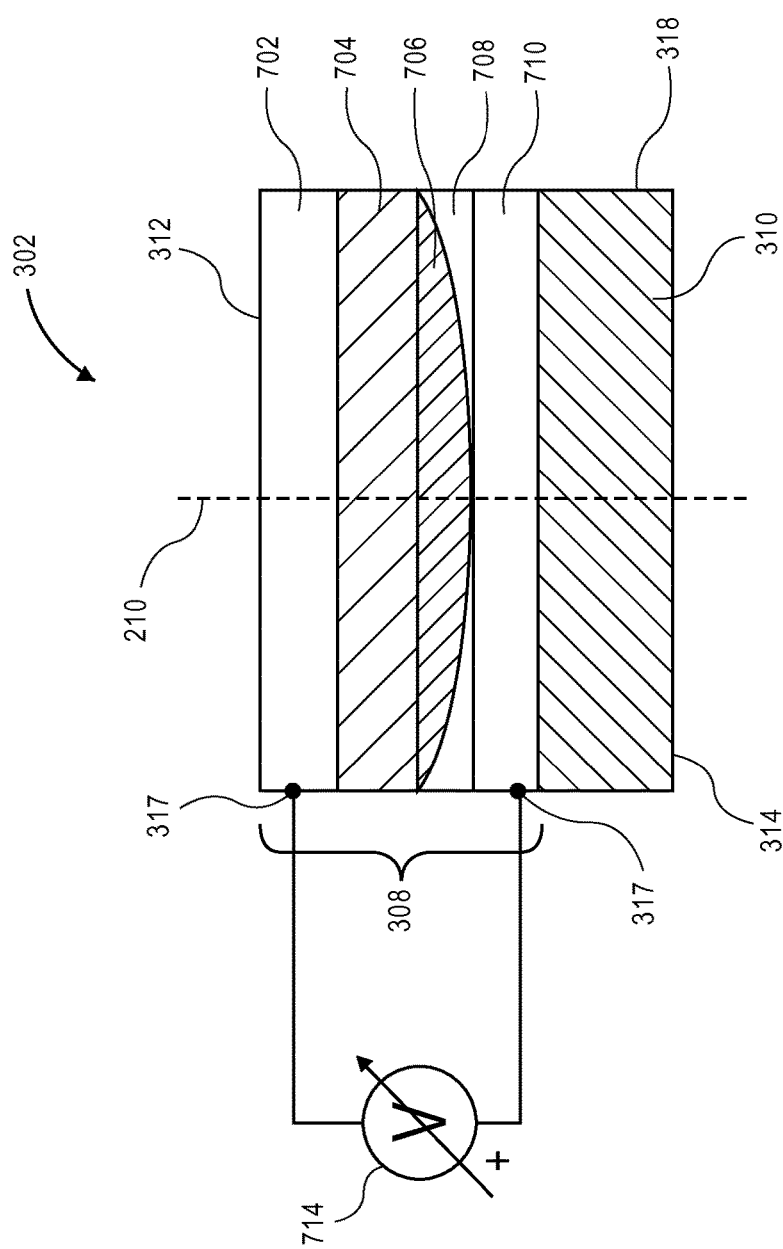
FIG. 7 is a cross-sectional view of an electro-optic portion of an electrically activated lens component in accordance with an embodiment.

Referring to FIG. 7 a cross-sectional view of an electro-optic portion of an electrically activated lens component is shown in accordance with an embodiment. It will be appreciated that FIG. 7 represents an embodiment of electro-optic portion 302, but there are many different embodiments of electrically active elements that may be integrated in electrically activated lens component 300, including both solid-state and liquid-state electro-optic apertures. Several of such embodiments are described in U.S. patent application Ser. No. 14/146,259, titled "Electro-Optic Aperture Device," filed on Jan. 2, 2014, which is incorporated herein by reference. The range of electro-optic apertures that is contemplated to be within the scope of this disclosure includes electro-optic apertures that are apodized, continuously variable, or discretely variable. Thus, the aperture may be formed from multiple discrete steps of electrochromic layers placed on any and all surfaces of a substrate 310. A general description of one such embodiment follows.

Electro-optic portion 302 may have a stack including electrochromic layer 308 on substrate 310. Electrochromic layer 308 may include: a front transparent conductor 702, an ion source 704, an ion conduction layer 706, an active electrochromic layer 708, and a rear transparent conductor 710. Each stack element may be in physical contact with an adjacent stack element. In an embodiment, ion source 704 may be fully separated from active electrochromic layer 708 by ion conduction layer 706. The ion source 704 layer may store suitable ions, for example, lithium ions to activate the electrochromic layer 708 when a sufficient charge field is generated between front transparent conductor 702 and rear transparent conductor 710. Accordingly, ion conduction layer 706 may allow ions that have been generated by ion source 704 to transmit toward and to enter active electrochromic layer 708.

Rear transparent conductor 710 may be formed directly on substrate 310. The other elements of electro-optic portion 302 may be sequentially formed over rear transparent conductor 710. In other embodiments, a second substrate (not shown) may be located above front transparent conductor 702, and in some cases, front transparent conductor 702 may be formed directly on the second substrate. In still other embodiments, such as in a liquid-state electro-optic aperture, the second substrate may be a coverslip, such as a thin layer of glass, which retains a liquid electrochromic material.

The transparent conductors may include a layer of indium tin oxide or other transparent conductive material formed into a thin layer. The transparent conductors may provide a conductive path for charge from driver circuit 610 to be applied to ion source 704 while at the same time allowing free passage of image rays 230. Accordingly, front transparent conductor 702 and rear transparent conductors 710 may be electrically connected with respective electrical contacts 317. Likewise, each of electrical contacts 317 may be electrically connected with driver circuit 610, which may provide appropriate input charge.

As described above, in an embodiment, electrical contacts 317 may be formed on front surface 312, rear surface 314, or peripheral edge 318 of electro-optic portion 302. For example, electrical contacts 317 may be sputtered, printed, soldered, or otherwise deposited on respective transparent conductors 702, 710. Alternatively, electrical contacts 317 may be formed on substrate 310 and appropriate electrical connections, e.g., leads or vias, may be routed to corresponding transparent conductors 702, 710. Furthermore, electrical contacts 317 may be accessibly located. For example, in an embodiment, electrical contacts 317 may be located on electro-optic portion 302 such that they are visibly exposed or at least not covered by front lens 304, rear lens 306, or any other film or coatings of electrically activated lens component 300.

In an embodiment, active electrochromic layer 708 tapers from an outer edge toward optical axis 210. In other words, a thickness of active electrochromic layer 708 may decrease in a gradual or step-like fashion from the outer edge toward optical axis 210. As a result, active electrochromic layer 708 may have a thickness of essentially zero at optical axis 210. In operation, the tapered profile of active electrochromic layer 708 creates an aperture opening of a maximum size when no voltage is applied from driver circuit 610, but as driver circuit 610 increases the charge in the transparent conductors, the tapered layer will cause the aperture opening to gradually decrease in diameter toward a minimum. Thus, stop aperture of electro-optic portion 302 may be reversibly varied by increasing and decreasing charge supplied by driver circuit 610 to the transparent conductors 702, 710. In an embodiment, an activation voltage may be between zero volts and 2 volts. Such activation voltage may result, for example, in a gradated voltage of between about 2 volts at the outer edge of active electrochromic layer 708 to zero volts at the location coincident with the aperture diameter in the active electrochromic layer 708.

Although electro-optic portion 302 has primarily been described with respect to the ability to create a variable aperture, electro-optic portion 302 structure may be modified to achieve other electrically activated variable optical properties. For example, electrochromic layer 308 and/or substrate 310 may be varied to control light transmission, light polarization, or optical power/focusing of mobile device lens assembly 400.

As an example of an electrically activated lens component 300 that may achieve a light filtering effect, electro-optic portion 302 may include a plurality of stacked electrochromic layers 308 that are independently driven. Thus, a first electrochromic layer 308 may be driven by a first driver circuit 610 and a second electrochromic layer (not shown) may be driven by a second driver circuit (not shown). In this manner, electro-optic portion 302 as a whole may be controlled to act as a neutral density filter that exhibits substantially homogeneous reduction in intensity of light from an imaged scene across all visible colors or wavelengths of interest.

In other applications, electro-optic portion 302 may include liquid crystals within substrate 310 that may be selectively oriented depending on a voltage applied to electrical contacts 317. For example, the liquid crystals may be oriented differently to adjust focus. Alternatively, the liquid crystals may be oriented differently to transmit different light polarizations. Furthermore, different portions of electro-optic portion 302 may be activated to make some portions opaque while keeping other portions optically transparent, and thus, monitoring of object data collected from image sensor 208 may be used to differentiate the object angle that an image is transmitted toward the image sensor 208 to identify or estimate a spatial location of the object in a scene. Thus, the example of an electrically variable aperture provided by electro-optic portion 302 is not intended to be restrictive, and in fact, electro-optic portion 302 may be varied within the scope of this disclosure to provide one or more optical effects beyond stop aperture control.

The various lenses and optical elements or components of mobile device lens assembly 400 may be combined and fixed relative to one another such that the entire assembly is moved relative to the image sensor 208 during use. More particularly, electrically activated lens component 300 may be physically associated with one or more optical elements or components, such as second lens element 402, intermediate lenses 404, field flattener lens 406, infrared filter 206, etc. Such physical association may be made by incorporating electrically activated lens component 300 within a chassis, barrel, frame, or other mechanical holder or carrier that supports and positions mobile device lens assembly 200 relative to image sensor 208. In some embodiments, lenses of mobile device lens assembly 400 may be fixed in groups, and those groups may be fixed together subsequently. For example, second lens element 402, intermediate lens elements 404, and field flattener lens 406 may all be fixed within a same barrel or frame to maintain their relative position. Subsequently, electrically activated lens component 300 may be engaged with second lens element 402, and the interlock structures may be bonded to one another using, e.g., a chemical adhesive, to form an overall lens assembly. Thus, the electrically activated lens component 300 and the second lens element 402 may be directly coupled, e.g., may be bonded directly to one another such that their surfaces are in contact but for an intervening adhesive layer. In an embodiment, the holder or carrier does not need to be rotated in order to focus an image on image sensor 208. Rather, the entire mobile device lens assembly 200 may be moved axially relative to image sensor 208 to focus the image.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A lens assembly, comprising:
   an electrically activated lens component, the electrically activated lens component including
      an electro-optic portion having an electrochromic layer coupled to a substrate, wherein the electro-optic portion includes a front surface on the electrochromic layer and a rear surface on the substrate, and wherein a first interlock boss extends rearward from the rear surface,
      a front lens mounted on the front surface, and
      a rear lens mounted on the rear surface and aligned with the front lens along an optical axis, wherein the rear lens includes an outer edge laterally inward from the first interlock boss; and
   a lens element having an interlock surface that is to engage with the first interlock boss to align the electrically activated lens component and the lens element along the optical axis.

2. The lens assembly of claim 1, wherein a second interlock boss extends forward from the lens element, the second interlock boss having the interlock surface that is to resist transverse dislocation of the electrically activated lens component relative to the lens element when the interlock surface is engaged with the first interlock boss.

3. The lens assembly of claim 1, wherein the electrically activated lens component includes a biconvex lens component, and wherein the lens element includes a meniscus lens element.

4. The lens assembly of claim 3, wherein the biconvex lens component is a positive biconvex lens component, and wherein the meniscus lens element is a negative meniscus lens element.

5. The lens assembly of claim 4, further comprising a field flattener lens aligned with the lens element along the optical axis.

6. The lens assembly of claim 5, further comprising at least two intermediate lens elements between the lens element and the field flattener lens, wherein the intermediate lens elements are aligned with the lens element and the field flattener lens along the optical axis.

7. The lens assembly of claim 6, wherein the front lens and the field flattener lens are separated by a z-height of less than 6 mm.

8. An apparatus, comprising:
   a portable electronic device being a smartphone or a tablet computer and having a driver circuit and a lens assembly, the lens assembly including:
      an electrically activated lens component, the electrically activated lens component including
         an electro-optic portion having an electrochromic layer coupled to a substrate, wherein the electro-optic portion includes a front surface on the electrochromic layer and a rear surface on the substrate, and wherein a first interlock boss extends rearward from the rear surface,
         a front lens mounted on the front surface, and
         a rear lens mounted on the rear surface and aligned with the front lens along an optical axis, wherein the rear lens includes an outer edge laterally inward from the first interlock boss, and
      a lens element having an interlock surface that is to engage with the first interlock boss to align the electrically activated lens component and the lens element along the optical axis;
   wherein the driver circuit is to output a drive voltage to the electro-optic portion to control the electrically activated lens component.

9. The apparatus of claim 8, wherein a second interlock boss extends forward from the lens element, the second interlock boss having the interlock surface that is to resist transverse dislocation of the electrically activated lens component relative to the lens element when the interlock surface is engaged with the first interlock boss.

10. The apparatus of claim 8, wherein the electrically activated lens component includes a biconvex lens component, and wherein the lens element includes a meniscus lens element.

11. The apparatus of claim 10, wherein the biconvex lens component is a positive biconvex lens component, and wherein the meniscus lens element is a negative meniscus lens element.

12. The apparatus of claim 11, further comprising a field flattener lens aligned with the lens element along the optical axis.

13. The apparatus of claim 12, further comprising at least two intermediate lens elements between the lens element and the field flattener lens, wherein the intermediate lens elements are aligned with the lens element and the field flattener lens along the optical axis.

14. The apparatus of claim 13, wherein the front lens and the field flattener lens are separated by a z-height of less than 6 mm.

15. A lens assembly, comprising:
   an electrically activated lens component, the electrically activated lens component including an electro-optic portion having an electrochromic layer coupled to a substrate, wherein the electro-optic portion includes a front surface on the electrochromic layer and a rear surface on the substrate, and wherein a first interlock boss extends rearward from the rear surface, a front lens mounted on the front surface, a rear lens mounted on the rear surface and aligned with the front lens along an optical axis, wherein the rear lens includes an outer edge laterally inward from the first interlock boss; and a lens element directly coupled with the electrically activated lens component such that the electrically activated lens component and the lens element are aligned along the optical axis.

16. The lens assembly of claim 15, wherein a second interlock boss extends forward from the lens element to engage the first interlock boss, the second interlock boss having an interlock surface that is to resist transverse dislocation of the electrically activated lens component relative to the lens element when the interlock surface is engaged with the first interlock boss.

17. The lens assembly of claim 15, wherein the electrically activated lens component includes a biconvex lens component, and wherein the lens element includes a meniscus lens element.

18. The lens assembly of claim 17, wherein the biconvex lens component is a positive biconvex lens component, and wherein the meniscus lens element is a negative meniscus lens element.

19. The lens assembly of claim 18, further comprising a field flattener lens aligned with the lens element along the optical axis.

20. The lens assembly of claim 19, further comprising at least two intermediate lens elements between the lens element and the field flattener lens, wherein the intermediate lens elements are aligned with the lens element and the field flattener lens along the optical axis.

* * * * *